US005511917A

United States Patent [19]
Dickson

[11] Patent Number: 5,511,917
[45] Date of Patent: Apr. 30, 1996

[54] FASTENER WITH GRAPHIC INDICATOR OF DIMENSIONS AND METHOD FOR GRAPHICALLY INDICATING FASTENER DIMENSIONS

[75] Inventor: Charles F. Dickson, Chicago, Ill.

[73] Assignee: Dickson Weatherproof Nail Co., Evanston, Ill.

[21] Appl. No.: 438,700

[22] Filed: May 11, 1995

[51] Int. Cl.⁶ .................................................. F16B 15/00
[52] U.S. Cl. .......................... 411/439; 411/14; 411/923
[58] Field of Search ............................. 411/14, 439, 923; 40/309, 662, 299

[56] References Cited

U.S. PATENT DOCUMENTS

| | | | |
|---|---|---|---|
| 780,744 | 1/1905 | Dix | 411/439 |
| 1,829,974 | 11/1931 | Williams | 411/439 |
| 5,165,831 | 11/1992 | Yager et al. | 411/14 |

*Primary Examiner*—Steven N. Meyers
*Assistant Examiner*—Fredrick Conley
*Attorney, Agent, or Firm*—Willian Brinks Hofer Gilson & Lione

[57] ABSTRACT

A method and apparatus for graphically indicating the dimensions of fasteners on the fastener itself. According to a preferred embodiment, graphical indica are disposed on the head of a nail to visually indicate the length and/or gauge of the nail. Such indicia may include numerals and other shapes or objects. Preferably, one or more hatch marks are disposed about the face of the nail in the form of a clock face and representing such dimensions.

17 Claims, 2 Drawing Sheets

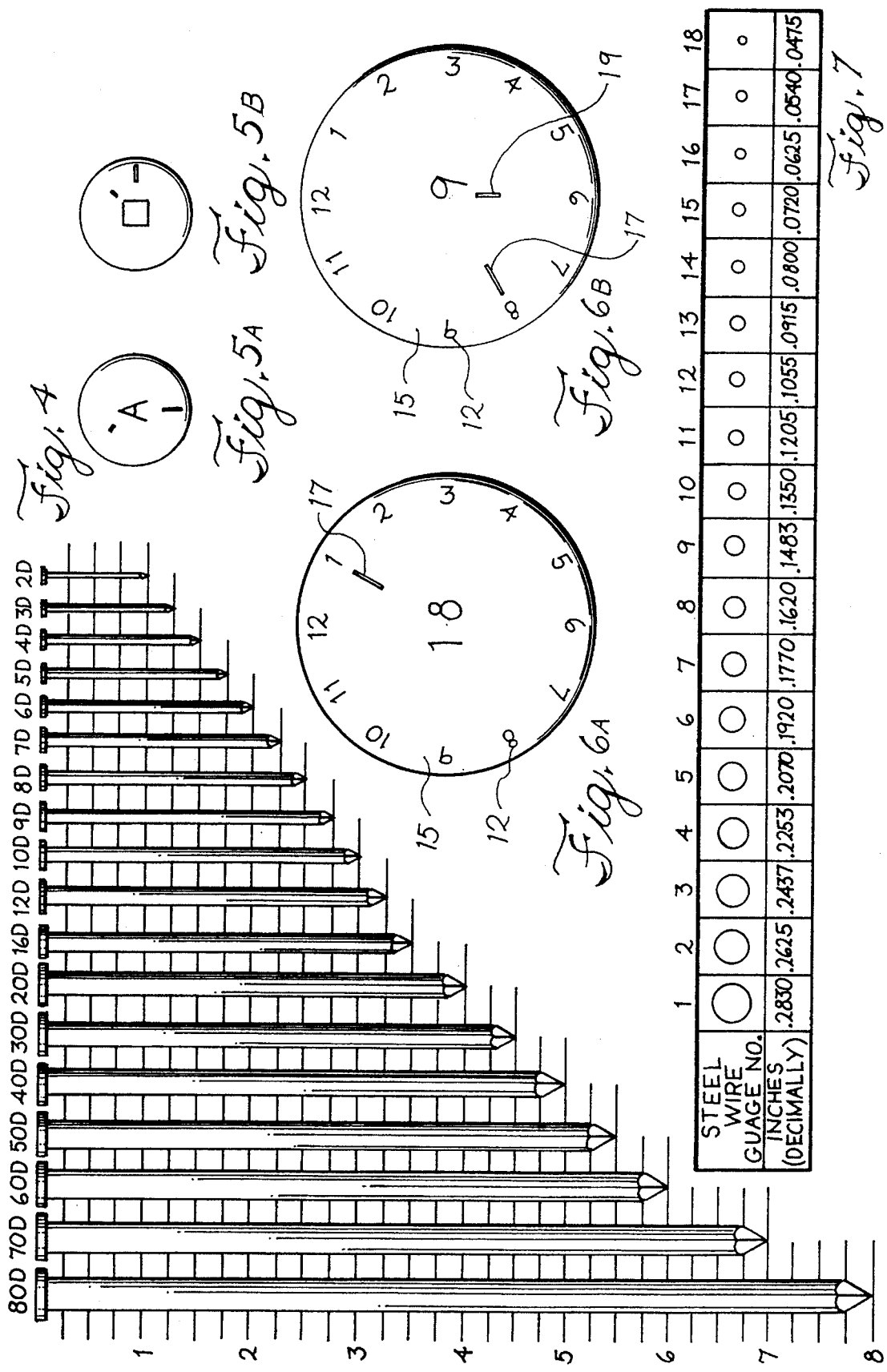

5,511,917

FASTENER WITH GRAPHIC INDICATOR OF DIMENSIONS AND METHOD FOR GRAPHICALLY INDICATING FASTENER DIMENSIONS

FIELD OF THE INVENTION

This invention relates to fasteners including nails, screws, pins, rivets and bolts. More particularly, this invention relates to placing graphic indicators on the heads of fasteners to visually illustrate the dimensions of the fastener.

BACKGROUND OF THE INVENTION

Fasteners are used for various industrial as well as home applications. Fasteners typically have a head, a shank, a length, a gauge (a measurement of diameter) and a weight—all of which can vary. In most instances, the fastener' features such as shape, length, gauge and weight play an integral role in determining the type of fastener to use for a certain application. Both purchasers and users of fasteners need to be able to quickly recognize the fastener's dimensions. Therefore, it is important and helpful to provide the purchaser and user of fasteners with this information.

For nails, two important dimensions that should be readily recognizable are the length and the gauge of the nail. The length and the gauge of nails are generally provided on or in the packaging that nails are sold or displayed with in a store. However, it would be advantageous to provide such information about the nail on the nail itself.

Means for identifying various features of fasteners on the fastener itself are known in the art. For example, U.S. Pat. No. 5,120,174 discloses a shell which fits over a nut and has means such as an arrow for indicating whether the nut has rotated. U.S. Pat. No. 5,098,240 discloses the use of dots, lines, or hatch marks on the head or shank of a shear pin to indicate the orientation of the plies, the orientation of the layers, or the orientation of the fibers within the shear pin. In U.S. Pat. No. 3,550,244, a method is disclosed for coding dowel pins with colors and different shaped indentations to indicate the dimensional variance of the dowel pin. U.S. Pat. No. 2,764,886 discloses the use of electrical cell screw heads having cross slots, circular slots, or a single slot to indicate the type of electrical service provided by the different electrical cells. In addition, U.S. Pat. No. 1,241,290 discloses the use of colors, symbols and characters on the heads of map push pins to keep record of routes, territories, highways, surveys, or bridges and to locate work sites on a map, chart, or diagram. Finally, in U.S. Pat. No. 752,588, a rivet head having intaglio characters for identifying the manufacturer of the rivet is disclosed.

None of the above-listed references disclose or even suggest placing indicators which graphically identify the dimensions such as length and gauge of the fastener on the fastener head itself. Such identification is particularly advantageous in states on the Atlantic, Pacific and Gulf coasts where natural disasters such as earthquakes and hurricanes occur. Because these natural disasters are capable of and often do destroy homes and buildings, these states as well as others have enacted very strict building codes. These building codes require buildings and homes to be constructed according to strict rules which specify that certain construction materials and types of fasteners must be used. Graphic indicia indicating the length and gauge of the fastener thus allow an inspector to quickly determine whether the fasteners used in the structure comply with the building codes by simply looking at the fastener head. Therefore, the cumbersome and destructive task of removing the fasteners from the material they are embedded in to determine if the correct fasteners were used is avoided.

SUMMARY OF THE INVENTION

In view of the above, it is an object of this invention to provide the dimensions of a fastener on the fastener itself to allow the purchaser or user to easily and accurately identify the length and gauge of the fastener. Accordingly, the present invention comprises a method and apparatus graphically illustrating the gauge and the length of the fastener on the face of the fastener head. In one aspect, the present invention comprises a fastener which includes a shank, and a head coupled to the shank and having a given length. The head further has a face with a first graphic indicator disposed thereon that provides information corresponding to the length of the fastener and a second graphic indicator disposed thereon that provides information concerning the gauge of the fastener. In another aspect, the invention comprises a method for applying first and second graphic indicators on the face of a fastener to illustrate the length and gauge of the fastener.

Placing the dimensions on the fastener head itself allows for ready identification of the fastener's dimensions if it becomes separated from its original packaging, if the fastener otherwise becomes combined with fasteners having similar dimensions, or once the fastener has been driven into a material such as wood, metal or concrete. As will be appreciated, a fastener having graphic indicia illustrating its length and gauge on the fastener head will allow both purchasers and users of fasteners to readily identify the type of fastener quickly and accurately. Additionally, when such indicia are provided on the heads of nails, building inspectors and the like can readily determine the length and gauge of the nail driven into a joist or beam without its removal.

These and other features and advantages of the present invention will become readily apparent to those skilled in the art from the following detailed description of the presently preferred embodiments of the invention, taken in conjunction with the accompanying drawings.

BRIEF DESCRIPTION OF THE DRAWINGS

FIG. 4 is a chart illustrating common nail lengths in inches and their corresponding lengths in penny units.

FIGS. 5a and 5b are top plan views of alternate embodiments of graphic indicators for identifying the dimensions of fasteners.

FIGS. 6a and 6b are top plan views of one preferred embodiment of the invention showing a clock face in phantom on a nail head with the graphic indicators identifying the dimensions of the fastener.

FIG. 7 is a chart illustrating common nail gauges and the corresponding diameters of the nails in inches.

DETAILED DESCRIPTION OF THE PRESENTLY PREFERRED EMBODIMENTS

The present invention is applicable to all types of fasteners having a variety of heads and shanks, including but not limited to nails, screws, pins, rivets and bolts. For ease of explanation, the present invention will be described in further detail using a nail as the presently preferred type of fastener. As those skilled in the art will appreciate, however, this description is in no way meant to limit the applicability of the present invention to nails alone and other fasteners are contemplated without departing from the spirit and scope of the invention.

Figures 1, 2A, 2B, 2C:
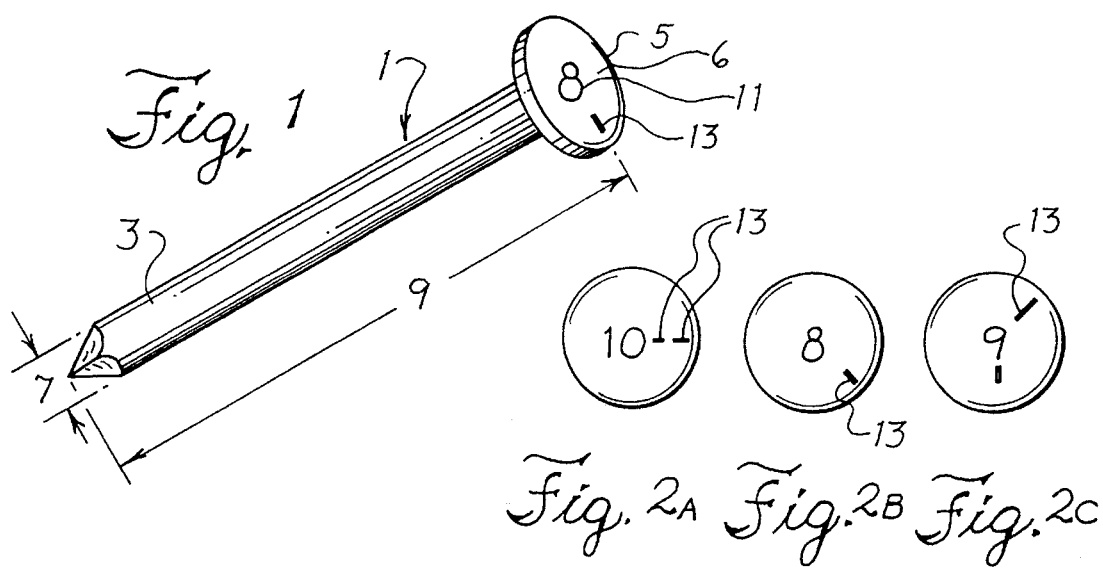
FIG. 1 is a perspective view of a nail employing the graphic indicators of the invention for identifying the dimensions of a fastener.
FIGS. 2a, 2b and 2c are top plan views of various nail heads having graphic indicators employing the invention to identify the dimensions of specific fasteners.

Referring now to the drawings, FIG. 1 shows a fastener 1 having a shank 3, a head 5 with a face 6, a gauge (a measure of diameter) 7 and a length or "penny" 9. As is common in the art, fasteners are assigned gauge numbers which correspond to, but may not be equivalent to, the fastener's true or actual diameter. Different types of fasteners have different gauges. FIG. 7 illustrates several commonly used types of nails along with their gauges and corresponding diameters. As shown in FIG. 7, a nail with gauge number 1 actually has a diameter of 0.2830 inches.

Those of ordinary skill in the art will also appreciate that the lengths of fasteners are generally given in inches. Nails, one type of fastener, are unique because the length of a nail is also often given in the form of penny units which are represented by the symbol "d." FIG. 4 illustrates commonly used nails ranging in length from 2d, which is 1 inch long, to 80d, which is 8 inches long. As further shown in FIG. 4, nails having a penny between 2d–16d increase in size by increments of one quarter inch. Nails having a penny larger then 16d increase in length by increments of one half inch and nails having a penny larger that 60d increase in length by increments of one inch.

Referring back to FIG. 1, according to the invention the fastener head 5 includes graphic indicators 11 and 13 for displaying the gauge (or diameter) and length (or penny) of the fastener. Graphic indicator 11 is preferably disposed in the center of the fastener head 5 and indicates the gauge or corresponding diameter of the fastener 1. Graphic indicator 13 is preferably disposed near the edge of the fastener face and indicates the length of the fastener. The presently preferred graphic indicators 11 and 13 shown in FIG. 1 comprise a numeral and a preferentially placed hatch mark, respectively. As will be described in more detail below, the hatch mark is preferably disposed in accordance with the hours of a standard clock face to represent the length of the fastener. As one skilled in the art will appreciate, however, the gauge or corresponding diameter of the fastener may be graphically indicated on the listener head 5 by a variety of other symbols or characters and disposed in a variety of other locations on the fastener head.

As shown in FIG. 5, for example, in one alternate embodiment of the invention, the gauge or diameter of the fastener may be graphically represented as shape or character. In such an embodiment, each gauge number could be assigned a different letter or letters. As shown in FIG. 5a, gauge number "1" could correspond to the letter A, gauge number 2 to letter B and so on. In an alternate preferred embodiment, the gauge number is indicated by a shape placed in the center of the fastener head. As such, gauge number "1" could correspond to a square (see FIG. 5b), gauge number "2" could correspond to a triangle and so on.

In the presently preferred embodiment of the invention, the gauge of a nail may be graphically indicated as an arabic numeral or a combination of arabic numerals as shown in FIGS. 2a–2c. It should be understood that the actual diameter of the nail in inches, centimeters, or any other suitable units may be also be represented on the nail head instead of the gauge number itself. For a nail having gauge number "1" (a diameter of 0.2830 inches), 0.2830 could be placed on the fastener head 5 instead of the numeral "1". In a more preferred embodiment, however, the gauge of the nail rather than its actual diameter is graphically indicated by an arabic numeral or numerals in the center of the nail head.

Referring now to FIGS. 2a–2c and 6a–6b, one or more graphic indicators 13 can be used to graphically illustrate the length of the fastener. If the fastener has a length which corresponds to a whole number, then only one length indicator may be necessary or required for its representation, as shown in FIGS. 2b and 6a. However, if the fastener has a length that includes a fractional number, such as 3½ inches, then two length indicators may be employed to properly and accurately indicate the length of the fastener, as shown in FIGS. 2a, 2c and 6b. For a nail having a length that is not a whole number, a first length indicator is preferably used to indicate the whole length of the nail, and a second length indicator is preferably used to indicate the fractional length of the nail. For example, if the nail is at least 2½ inches long, then the first length indicator will indicate that the nail is at least 2 inches long, the whole length of the nail, and the second length indicator will correspond to ½, the fractional length of the nail. In the preferred embodiment of the invention, the numerical values associated with the various length indicators are therefore added together to yield the total length figure for the nail.

It will be appreciated by those skilled in the art that length indicators can comprise almost any mark, shape or character. For example, as shown in FIGS. 2a–2c, the presently preferred length indicators are hatch or tic marks; however, the length indicators could also be, but are not limited to, letters, numbers, or other geometrical shapes.

FIG. 6 illustrates a top plan view of a nail head 5 with the numbers 12 of a clock face drawn in phantom. In the preferred embodiment shown in FIG. 6, the face of the nail head 5 thus represents a clock face 15 and the length indicators represent the "hands" of the clock. According to the preferred embodiment, the whole length of the nail can be represented by the "small hand" or "hour hand" 17 of the clock. For example, if the nail is 4 inches long, then the length indicator would be placed at the position coinciding with four o'clock. Similarly, the fractional length, if any, of the nail can be represented by the "large hand" or "minute hand" 19 of the clock. Thus, if the nail has a fractional length of ¼, 1/2, or ¾ inches, then the length indicator would be placed at a position corresponding to ¼ (the numeral three), ½ (the numeral 6), or ¾ (the numeral 9) past the hour, respectively. In the preferred embodiment, the actual numbers of a clock face are not applied to the nail head. (The numbers of the clock face are provided in phantom in FIG. 6 to aid in describing the present embodiment.) Alternatively, however, such numerals can be included on the nail head without departing from the essential scope of the invention.

Various combinations of first and second graphical indicators of the invention are shown in FIGS. 6a–6b. Referring to FIG. 6a, a nail gauge of "18" is graphically indicated and disposed in the center of the nail head 5. A first length indicator 17 is also placed at a position corresponding to the position of the numeral "1" or the hour of one o'clock on the clock face. Therefore, according to the invention, this nail has a length of one inch and a gauge of 18. Similarly, as shown in FIG. 6b, a nail gauge of "9" is graphically indicated and disposed in the center of the nail head. A first length indicator 17 is placed at a position corresponding to the number "8" or the hour of eight o'clock on the clock face indicating that the nail is at least 8 inches long. A second length indicator 19, however, also appears in a position corresponding to the numeral "6" or half past the hour on the clock face. As described above, the position of the second length indicator indicates that the nail is one half inch longer than eight inches. Therefore, according to the embodiment shown in FIG. 6b, this nail would have a gauge of 9 and a length of 8½ inches.

If the nail length is given as its "penny", the length of the nail will be determined in a slightly different manner. If the penny of the nail is between 1 and 12, then one length indicator 17 is placed on the nail head at the position corresponding to the equivalent numeral on the clock face. However, if the penny of the nail is greater than 12, then in one alternate embodiment of the invention two length indicator marks are preferably placed along the outer edge of the nail head at positions corresponding to their equivalent numbers on a clock face such that when the two numbers are added or multiplied together their sum or product will equal the penny of the nail.

Indicators for graphically illustrating the gauge and length of a fastener may be applied to the fastener head in a variety of ways. As one skilled in the art will appreciate graphic indicia can be printed or stamped on the fastener head in ink or industrial paint. The graphic indicators may also be applied to a paper or plastic material that is then bonded to the fastener head by means known in the art, such as an adhesive. In a preferred embodiment, the graphic indicators are embossed on the nail head as the nail head is formed. Means for embossing are well known in the art and thus do not require further discussion herein. Embossing is preferred because the graphic indicators are more likely to remain permanently applied to the fastener head. Graphic indicators that are embossed on a fastener head will likely also remain legible even if the fastener head is painted over. In contrast, graphic indicators that are painted or inked on the fastener head may become illegible once covered with paint.

Figure 3:
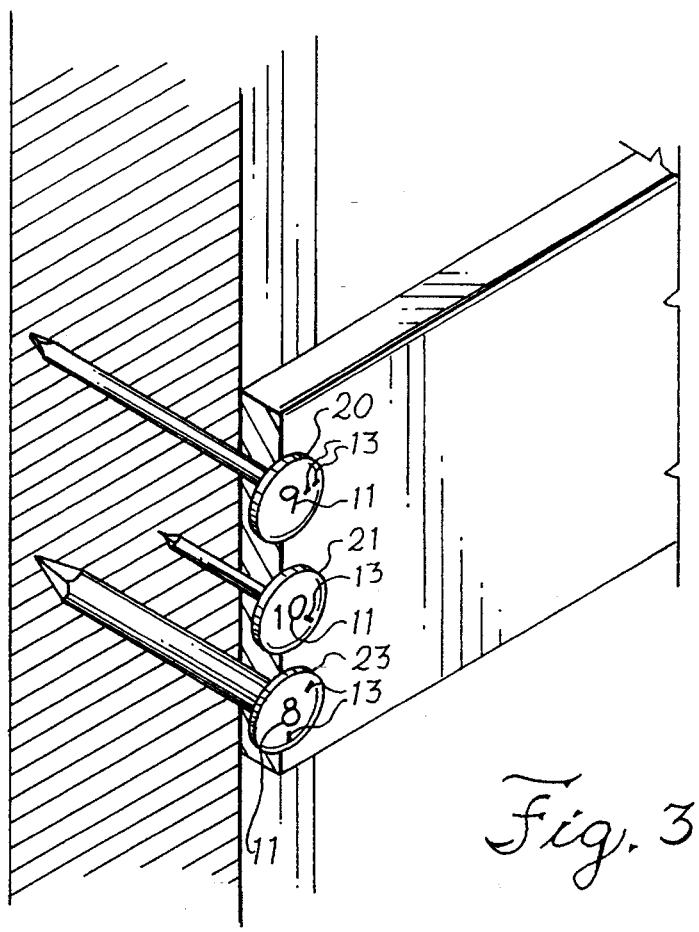
FIG. 3 is a perspective cut-away view showing fasteners employing the graphic indicators of the invention and holding a wooden board in place.

Moreover, when embossed on the fastener head, the graphic indicators should not wear off as the fastener is being driven into a material. Graphic indicators that are painted, inked or otherwise applied to the fastener head may wear off while being driven into a material or after being exposed to the elements for a substantial period of time. FIG. 3 shows three fasteners 20, 21, 23 that have been driven into a wooden board or other similar material. As shown, the graphic indicators on the fastener heads are preferably still visible. Thus, a worker or a building inspector can readily determine the dimensions of the fastener even after it has been driven into such a material.

In addition to the graphic indicators 11 and 13 described above, other graphic indicia may also be placed on the fastener head. For example, it may be necessary to place an indicator on the fastener head which serves to indicate the proper orientation in order to read the "clock face" and determine the length of the fastener. If the gauge indicator is a shape such as a square shown in FIG. 5b, it may be difficult to determine which way to view the fastener to properly ascertain the length of the fastener. A registration line or other mark may be placed on the fastener head to indicate how the fastener should be positioned in order to determine the length of the fastener. In a preferred embodiment, a company logo or trademark can be placed on the fastener head for this purpose. The company logo or trademark would also as serve to identify the manufacturer of the fastener. Other registration marks are also contemplated and suitable.

From the foregoing, it will be observed that numerous modifications and variations can be effected without departing from the true spirit and scope of the present invention. It will be appreciated that the above disclosure is intended as an exemplification of the invention, and that the invention is not limited to the specific embodiments described and shown herein; rather the invention is commensurate with the proper scope of the following claims.

What is claimed is:

1. A fastener comprising:

a shaft having a length and first and second ends;

a head having a face, the head coupled to the first end of the shaft;

a first graphic indicator, the first graphic indicator disposed on the face of the fastener head and providing information corresponding to the length of the fastener; and a second graphic indicator, the second graphic indicator also disposed on the face of the fastener head and providing information corresponding to the gauge of the fastener.

2. The fastener of claim 1 further comprising a third graphic indicator disposed on the face of the fastener head and providing information corresponding to the fractional length of the fastener.

3. The fastener of claim 1 wherein said face comprises a center and an outer edge, and the first graphic indicator is disposed nearer the outer edge of the face.

4. The fastener of claim 3 further comprising a third graphic indicator disposed on the face of the head and located between the outer edge and the center, the third graphic indicator corresponding to the fractional length of the fastener.

5. The fastener of claim 3 wherein said first graphic indicator is disposed at a position coinciding with an hourly position on a clock face the hourly position being equivalent to the length of the fastener.

6. The fastener of claim 5 further comprising a third graphic indicator disposed between the outer edge and the center of the face at a position coinciding with an hourly position on the clock face equivalent to the fractional length of the fastener, wherein the positions on the clock face corresponding to ¼ hour, ½ hour and ¾ hour are equivalent to a fractional length of ¼, ½, and ¾, respectively.

7. The fastener of claim 6 wherein the second graphic indicator is disposed in the center of the face.

8. The fastener in claim 7 wherein said first graphic indicator comprises at least one arabic numeral.

9. The fastener of claim 1 wherein said fastener comprises a nail.

10. A fastener having a length comprising:

a shaft;

a head coupled to the shaft and having a face, the face including graphic indicia depicting a clock face; and at least one length indicator disposed on said face, the at least one length indicator corresponding to a first hand on the clock face and placed at a position corresponding to an hour on the clock face equivalent to the length of the fastener.

11. The fastener of claim 10 further comprising a second length indicator disposed on said fastener head face, the second length indicator representing a second hand on the clock face and placed at a position corresponding to a position on the clock face equivalent to the fractional length of the fastener, wherein the positions on the clock face corresponding to ¼ hour, ½ hour and ¾ hour are equivalent to a fractional lengths of ¼, ½, and ¾ of the shaft respectively.

12. The fastener of claim 11 wherein said fastener comprises a nail.

13. A method for graphically depicting the gauge and length of a fastener having a head and a shank comprising:

applying a first graphic indicator to the face of the fastener head to illustrate the gauge of the fastener; and applying a second graphic indicator to the face of the fastener head to illustrate the length of the fastener.

14. The method of claim 13 further comprising applying a third graphic indicator to the face of the fastener to illustrate any fractional length of the fastener.

15. The method of claim 14 wherein the first graphic indicator comprises at least one arabic numeral.

16. A method for graphically illustrating the gauge and length of a fastener having a shank and a head coupled to the shank, comprising:

applying a first graphic indicator to the face of the fastener head to illustrate the gauge of the fastener; and applying a second graphic indicator to the face of the fastener head at a position coinciding with an hourly position on a clock face equivalent to the length of the fastener.

17. The method of claim 16 further comprising applying a third graphic to the face of the fastener at a position corresponding to an hourly position on a clock face equivalent to the fractional length of the fastener wherein the positions on the clock face corresponding to ¼ hour, ½ hour and ¾ hour are equivalent to a fractional lengths of ¼, ½, and ¾ of the shaft respectively.

\* \* \* \* \*

UNITED STATES PATENT AND TRADEMARK OFFICE
CERTIFICATE OF CORRECTION

PATENT NO. : 5,511,917  
DATED : April 30, 1996  
INVENTOR(S) : Charles F. Dickson Page 1 of 2

It is certified that error appears in the above-indentified patent and that said Letters Patent is hereby corrected as shown below:

On the Title Page

In column 1, under "References Cited U.S. PATENT DOCUMENTS", please add the following:

```
--   752,588     2/1904    Rettig
   1,241,290    9/1917    Senftner
   2,764,886   10/1956    Wiesmann        72/16
   2,821,397    1/1958    Hartigan, Sr.   273/106.5
   3,550,244   12/1970    Villo et al.    29/407
   5,098,240    3/1992    Gapp et al.     411/424
   5,120,174    6/1992    Patti           411/431      --.
```

In column 2, line 3, under "ABSTRACT", delete "indica" and substitute --indicia--.

UNITED STATES PATENT AND TRADEMARK OFFICE
CERTIFICATE OF CORRECTION

PATENT NO. : 5,511,917
DATED : April 30, 1996
INVENTOR(S) : Charles F. Dickson

It is certified that error appears in the above-indentified patent and that said Letters Patent is hereby corrected as shown below:

Column 7, line 3, (claim 11), delete "lengths" and substitute —length—.

Column 8, line 15, (claim 17), delete "lengths" and substitute —length—.

Signed and Sealed this

Eleventh Day of February, 1997

Attest:

BRUCE LEHMAN

Attesting Officer

Commissioner of Patents and Trademarks